United States Patent [19]

Shumate et al.

[11] Patent Number: 5,021,170

[45] Date of Patent: Jun. 4, 1991

[54] OIL-BASED WELL BORE FLUIDS AND GELLANTS THEREFOR

[75] Inventors: Thomas G. Shumate, Spring; Louis P. Sokol, Sugar Land, both of Tex.

[73] Assignee: Baroid Technology, Inc., Houston, Tex.

[21] Appl. No.: 135,140

[22] Filed: Dec. 18, 1987

[51] Int. Cl.$^5$ .............................................. C09K 17/06
[52] U.S. Cl. ................................ 252/8.515; 252/8.511
[58] Field of Search ........................... 252/8.515, 8.511

[56] References Cited

U.S. PATENT DOCUMENTS

| | | | |
|---|---|---|---|
| 4,105,578 | 8/1978 | Finlayson et al. | 252/8.515 X |
| 4,287,086 | 9/1981 | Finlayson et al. | 252/8.551 X |
| 4,425,462 | 1/1984 | Turner et al. | 252/8.515 X |
| 4,442,011 | 4/1984 | Thaler et al. | 252/8.515 |

FOREIGN PATENT DOCUMENTS

WO83/02949 9/1983 PCT Int'l Appl. .............. 252/8.515
2195685 4/1988 United Kingdom .

OTHER PUBLICATIONS

TekMul 1949, publication, 5 pages, undated.

Primary Examiner—Robert L. Stoll
Assistant Examiner—Gary L. Geist
Attorney, Agent, or Firm—Browning, Bushman, Anderson & Brookhart

[57] ABSTRACT

An invert emulsion drilling fluid comprised of a liquid oleaginous medium, water, an emulsifier and a gellant comprised of sulfonated ethylene/propylene/5-phenyl-2-norbornene terpolymer and an organophilic clay.

21 Claims, No Drawings

OIL-BASED WELL BORE FLUIDS AND GELLANTS THEREFOR

BACKGROUND OF THE INVENTION

1. Field of the Invention

The present invention relates to well bore fluids and, more particularly, to drilling fluids or muds of the oil based variety, so called "invert" emulsion fluids.

2. Description of the Background

Drilling fluids or muds are based on aqueous formulations or oil-based formulations, the latter being sometimes referred to as invert emulsion muds. Invert emulsion drilling fluids find particular application where the use of water-based fluids would result in damage to the formation through which the drilling is progressing. For example, it is known that certain types of shale will heave and collapse if water-based drilling fluids are used. Since the oil-based drilling fluids do not result in any swelling of the shale, their use circumvents the heaving problem. Invert emulsion muds basically contain an oleaginous medium, such as a hydrocarbon liquid as the continuous phase, water as the dispersed phase, various emulsifying agents, wetting agents, weighting agents and viscosifiers, such as amine treated clays.

Water-based and most oil-based drilling muds are relatively easy to effectively viscosify. However, oil-based drilling fluids which use low aromatic content hydrocarbon liquids as the oleaginous phase are more difficult to viscosify using prior art gellants, such as amine treated clays. The use of oil-based drilling fluids having low toxicity, i.e. low aromatic content, is desirable and in many cases mandatory where the drilling conditions involve possible ecological damage, e.g. offshore drilling.

U.S. Pat. Nos. 4,425,462 and 4,442,011 disclose oil-based drilling fluids which employ sulfonated ethylene/propylene/5-phenyl-2-norbornene terpolymers (EPDM polymer). The use of organophilic clays as oil-based mud gellants is disclosed, for example, in U.S. Pat. Nos. 4,287,086 and 4,105,578. A prior art publication entitled *TekMul* 1949 discloses that EPDM polymers can be used as a replacement for all or part of the organophilic clay requirements of an oil-based mud. However, the publication does not suggest that a synergistic effect on viscosity is achieved by the use of the clay and the EPDM polymer, particularly in low aromatic content liquids.

SUMMARY OF THE INVENTION

It is therefore an object of the present invention to provide an improved gellant for well bore fluids, primarily oil-based drilling fluids.

Another object of the present invention is to provide an improved oil-based (invert emulsion) drilling fluid or mud having excellent viscosity and suspension characteristics.

A particular object of the present invention is to provide an improved oil-based drilling fluid utilizing a low aromatic content liquid hydrocarbon.

Yet a further object of the present invention is to provide a method for preparing an improved gellant for well bore fluids, primarily oil-based drilling fluids containing hydrocarbon liquids of low aromatic content.

The above and other objects of the present invention will become apparent from the description given herein and the appended claims.

The gellant composition of the present invention comprises an intimate mixture of an organic clay comprising the reaction product of an organic onium compound and a smectite clay and a sulfonated, ethylene/propylene/5-phenyl-2-norbornene terpolymer (EPDM polymer) wherein the weight ratio of the organophilic clay to the terpolymer is from about 6:1 to about 20:1.

The drilling fluid of the present invention comprises a liquid oleaginous phase, a polar liquid phase, and emulsifier and the gellant composition described above.

DESCRIPTION OF THE PREFERRED EMBODIMENTS

The liquid phase of the drilling fluid of the present invention is basically a two-phase mixture comprised of a liquid oleaginous phase and a polar liquid phase. The liquid oleaginous phase of the drilling fluids of the present invention include liquids, such as crude petroleum and fractions thereof as, for example, diesel oil, kerosene, fuel oil, light lubricating oil fractions, heavy naphthas having a boiling range between about 300° to about 600° F., low toxicity mineral oil as well as mixtures of any of the above. In general, virtually any liquid hydrocarbon solvent can be employed as the oleaginous medium. The particular liquid chosen as the oleaginous phase will depend upon conditions, such as temperatures encountered, both downhole and at the surface, ecological factors, etc. For example, when the drilling fluids are to be used in frigid areas, such as the North Slope of Alaska, the oleaginous phase should have a pour point below the temperatures normally prevailing in a permafrost zone, i.e. within the range of from about 14° to about 32° F. In sensitive ecological areas, a drilling fluid using a low toxicity, i.e. low aromatic content, hydrocarbon or mineral oil, as the oleaginous phase is preferred. Indeed, in virtually most drilling environments, low aromatic content oils are preferred because of their reduced toxicity. The term "low aromatic content" refers to a liquid hydrocarbon having less than about 20% by weight aromatics, less than about 15% by weight aromatics, more preferably less than about 5% by weight aromatics. A particular feature of the present invention is that drilling fluids of excellent viscosity and suspension characteristics can be formed from hydrocarbons or mineral oils which have low aromatic content. The oleaginous phase will generally be present in an amount of from about 30 to about 98% by volume of the liquid phase, and more preferably from about 70 to about 90% by volume of the liquid phase.

In addition to the oleaginous phase, the liquid phase of the drilling fluids of the present invention will contain a polar liquid phase, such as water, brines, etc., in an amount of from about 2 to about 70% by volume of the liquid phase, more preferably from about 10 to about 30% by volume of the liquid phase. Other polar liquids include lower alcohols, glycols, etc. which are generally water soluble. The polar liquid phase, when it is water, can contain salts such as NaCl, $CaCl_2$, etc.

The drilling fluids or muds of the present invention contain a gellant or viscosifier comprised of an organophilic clay and a sulfonated ethylene/propylene/5-phenyl-2-norbornene terpolymer (EPDM polymer). The organophilic clays used in forming the gellant of the present invention comprise reaction products of organic onium compounds with naturally occuring or synthetic clays. Such organophilic or organic modified clays are well known gellants or thickeners for oleaginous media, such as oil-based paints, drilling fluids, greases, printing inks and the like. The clay portion of the organophilic clay gellants are crystalline, complex inorganic silicates, the exact composition of which cannot be precisely defined since they vary widely from one natural source to another. However, these clays can be described as complex, inorganic silicates, such as aluminum silicates and magnesium silicates, containing, in addition to the complex silicate lattice, varying amounts of cation-exchangeable ions, such as calcium, magnesium and sodium. Hydrophilic clays which are preferred in this invention are the water-swelling smectite clays, such as montmorillonite, hectorite, saponite and particularly bentonite clay from Wyoming which contains exchangeable sodium ions. The clays may be used in the impure form as such or may be purified by centrifuging, an aqueous slurry of the clay.

Smectite-type clays prepared synthetically by either a pneumatolytic or, preferably, a hydrothermal synthesis process can also be used to prepare the present organophilic clays. Representative of such clays are montmorillonite, bentonite, beidellite, hectorite, saponite and stevensite. These clays may be synthesized hydrothermally by forming an aqueous reaction mixture in the form of a slurry containing mixed hydrous oxides or hydroxides as a desired metal, with or without, as the case may be, sodium or alternate exchangeable cation or mixture thereof, fluoride, in the proportions for the particular synthetic smectite desired. The slurry is then placed in an autoclave and heated under autogeneous pressure to a temperature within the range of approximately 100–325° C., for a sufficient period of time to perform the desired product. Representative hydrothermal processes for preparing synthetic smectite are described in U.S. Pat. Nos. 3,252,757; 3,586,478; 3,666,407; 3,671,190; 3,844,978; 3,844,979; 3,852,405 and 3,855,147, all of which are incorporated herein by reference. The cation exchange capacity of the smectite clays can be determined by the well known ammonium acetate method.

The organic onium compounds reacted with the smectite clays are desirably acidic salts of primary, secondary and tertiary amines, preferably quaternary ammonium compounds. The onium compounds should contain at least one alkyl, alkylene or alkylidiene radical having at least ten carbon atoms, preferably from about 16 to 22 carbon atoms. Typical quaternary ammonium compounds are dimethyl dihydrogenated tallow ammonium chloride, trimethyl hydrogenated tallow ammonium chloride, dimethyl benzyl octadecyl ammonium chloride and methyl benzyl dioctodecyl ammonium chloride. A typical acid salt of an amine is the acid salt of cocoaamine. Other organic onium compounds, such as organic phosphonium compounds, can be used. Organic modified clays and their preparation are more fully described in U.S. Pat. Nos. 2,531,427: 2,531,812; 2,966,506; 3,929,849; 4,287,086; 4,105,578, all of which are herein incorporated by reference.

The preferred organophilic clays for use in the drilling fluids of the present invention are dimethyldihydrogenated tallow ammonium bentonite, dimethylbenzylhydrogenated tallow ammonium bentonite, methylbenzyldihydrogenated tallow ammonium bentonite and cocoamine bentonite.

The EDPM polymer used in the gellant of the present invention are of the type generally described in U.S. Pat. No. 4,442,01, incorporated herein by reference. Basically, the EDPM polymers have about 5 to about 30 milliequivalents of sulfonate group per hundred grams of the sulfonated polymer, wherein the sulfonated group is neutralized with a metallic cation or an amine or ammonium counterion. The EPDM polymers have about 0.5 to about 20% by weight phenyl norbornene, or preferably about 1 to about 10%, most preferably about 2 to about 8%. The preferred polymers contain about 10 to about 80% by weight ethylene and about 1 to about 10% by weight of 5-phenyl-2-norbornene monomer, the balance of the polymer being propylene. Preferably, the polymer contains from about 30 to about 70% by weight ethylene, e.g. 50 weight percent, and 2 to about 8% phenyl-2-norbornene monomer, e.g. 5.0 weight percent.

A typical ethylene/propylene/5-phenyl-2-norbornene terpolymer has a Mooney viscosity (ML, 1+8, 212° F.) of about 16 and has an ethylene content of about 50 weight percent and a 5-phenyl-2-norbornene content of about 5 weight percent.

The terpolymers of this invention have a number average molecular weight ($\overline{M}n$), as measured by Gel Permeation Chromatograph (GPC), of about 5,000 to about 300,000, more preferably of about 10,000 to about 100,000, and most preferably of about 20,000 to about 80,000. The Mooney viscosity of the terpolymer is about 5 to about 90, more preferably about 10 to about 80, most preferably about 15 to about 50.

The gelling agent comprised of the terpolymer and the clay will generally be present in the drilling fluid in an amount of from about 0.5 pounds to about 10 pounds per 42 gallon barrel (ppb) of fluid.

In formulating the drilling muds of the present invention, the EPDM polymer and the organophilic clay are added to the liquid phase as an intimate mixture. Thus, the EDPM polymer and the organophilic clay are first milled or otherwise mixed in a manner to form an intimate, generally fine particle sized mixture of the EDPM polymer and the organophilic clay. This intimate mixture, which has been formed by milling or some other mixing procedure, is then added to the liquid phase.

The drilling fluids of the present invention also contain an emulsifier, well known to those in the art, such as a magnesium or calcium soap of a fatty acid, such as tall oil fatty acids. Mixtures of polyamides can also be employed as emulsifiers The emulsifiers will generally be present in amounts up to 20 ppb, more preferably from about 4 to about 10 ppb.

The drilling fluid of the present invention can also contain filtration control agents, such as lignites, treated with an amine to render them oil dispersible. Such filtration control agents can be present in amounts up to 20 pounds per barrel, more preferably from about 4 to about 10 pounds per barrel.

The drilling fluids can also contain additives, salts, such as calcium chloride, to provide salinity in such invert oil emulsions, and weighting agents such as barite or other weighting agents to achieve the desired density of the drilling fluid.

It is especially preferred that the clay and the EPDM polymer first be blended by milling to provide an intimately mixed fine powder, the mixture then being added to the drilling fluid. An especially preferred gellant or viscosifier is prepared by a method wherein a smectite-type clay is reacted with an organic onium compound, e.g. an acidic salt of a primary, secondary or tertiary amine, in the presence of the EPDM polymer, the organic onium compound, the clay and the EPDM polymer being admixed together simultaneously in a suitable mixing apparatus, such as a pug mill, a Banbury mixer, an extruder, etc. In this method, the organophilic clay is actually formed while the clay and polymer are being admixed. Although not fully understood, it is believed that this may lead to certain chemical interactions between the clay and the polymer accounting for the unique and superb viscosifying characteristics of the gellant. To more fully illustrate the present invention, the following non-limiting examples are presented.

EXAMPLE 1

The following test formulation and order of addition were followed in preparing the samples:

| | |
|---|---|
| Conoco LVT Oil[1], ml | 236 |
| INVERMUL ® NT[2], g | 6 |
| DURATONE ® HT[3], g | 6 |
| Lime, g | 3 |
| Gelling Agent, g | X |
| Stir 5 min. on Hamilton-Beach Mixer, high speed | |
| Tap Water, ml | 79 |
| Stir 15 min. on Hamilton-Beach Mixer, high speed | |
| EZ-MUL ® NT[4], g | 3 |
| Stir 5 min. on Hamilton-Beach Mixer, high speed | |
| Barite, g | 108 |
| Stir 15 min. on Hamilton-Beach Mixer, high speed | |
| Calcium Chloride, 94-96%, g | 22 |
| Stir 15 min. on Hamilton-Beach Mixer, high speed | |

[1] Low toxicity mineral oil containing 15% or less and marketed by Conoco Oil Company.
[2] An emulsifier comprised of calcium soaps of tall oil fatty acids in admixture with a wetting agent comprised of polyamides and marketed by NL Baroid division of NL Industries, Inc.
[3] A filtration control agent comprised of a lignite material treated with a quarternary ammonium compound marketed by NL Baroid division of NL Industries, Inc.
[4] A wetting agent comprised of polyamides and marketed by NL Baroid division of NL Industries, Inc.

The gelling agent description and manner of preparation is shown below:

A—geltone ® II[1] lab stock
B—TekMul #1949[2] as received
C—Lab mixed dry blend of GELTONE ® II (95 parts by weight) with TEkMul #1949 screened to less than 20 mesh (5 parts by weight)
D—Lab mixed dry blend of GELTONE ® II (90 parts by weight) with TekMul #1949 screened to less than 20 mesh (10 parts by weight)
E—Lab mixed dry blend of GELTONE ® (85 parts by weight) with TekMul #1949 screened to less than 20 mesh (15 parts by weight)
F—GELTONE ®, (90 parts by weight) and TekMul #1949 as received (10 parts by weight) added separately (not pre-blended together)
G—Plant production blending and milling together in a pug mill of a mixture of Wyoming bentonite and methylbenzyl 2-hydroxytallow quaternary amine chloride (90 parts by weight) with TekMul #1949 (10 parts by weight) ,6

[1] Methylbenzyl 2-hydroxytallow quaternary amine salt of Wyoming bentonite marketed by NL Baroid division of NL Industries, Inc. ,6
[2] A neutralized, sulfonated ethylene/propylene/5-phenyl-2-norbornene terpolymer having about 5 to about 30 MEQ. of sulfonate groups per hundred grams of the neutralized sulfonated polymer having about 0.5 to about 20 weight percent of 5-phenyl-2-norbornene and having a number average molecular weight of about 5,000 to 300,000 and marketed by Exxon.

Table I below shows a comparison of the clay and the terpolymer used individually with various dry blends of the clay and polymer which have been dry mixed prior to addition of the formulation.

TABLE I

| Comparison of GELTONE II and Tek Mul #1949 and Dry Blends of Both in a Mineral Oil Base Mud Formulation | | | | | | | | | | |
|---|---|---|---|---|---|---|---|---|---|---|
| Sample ID | I | II | III | IV | V | VI | VII | VIII | IX | X |
| Viscosifying Agent | A | A | B | B | C | C | D | D | E | E |
| Amount, g | 10.0 | 14.0 | 1.5 | 2.0 | 8.0 | 10.0 | 7.0 | 8.0 | 5.9 | 7.1 |
| Blend Ratio, clay/polymer | 100/0 | 100/0 | 0/100 | 0/100 | 95/5 | 95/5 | 90/10 | 90/10 | 85/15 | 85/15 |
| Initial Properties at 120° F. | | | | | | | | | | |
| Plastic Viscosity, cp | 19 | 24 | 12 | 15 | 19 | 20 | 21 | 21 | 18 | 23 |
| Yield Point, lb/100 ft² | 16 | 28 | 1 | 0 | 12 | 26 | 13 | 19 | 12 | 17 |
| 10 sec gel, lb/100 ft² | 10 | 15 | 0 | 1 | 8 | 13 | 9 | 11 | 7 | 10 |
| 10 min gel, lb/100 ft² | 12 | 18 | 1 | 2 | 11 | 15 | 12 | 13 | 10 | 14 |
| Properties After Rolling 16 hr at 150° F., Tested at 120° F. | | | | | | | | | | |
| Plastic Viscosity, cp | 20 | 24 | 24 | 122 | 18 | 24 | 19 | 21 | 18 | 23 |
| Yield Point, lb/100 ft² | 13 | 27 | 0 | 26 | 12 | 18 | 12 | 16 | 12 | 17 |
| 10 sec gel, lb/100 ft² | 9 | 15 | 2 | 3 | 7 | 11 | 8 | 9 | 7 | 10 |
| 10 min gel, lb/100 ft² | 11 | 17 | 3 | 5 | 10 | 14 | 11 | 12 | 11 | 14 |
| Properties After Rolling 16 hr at 250° F., 500 psi, Tested at 120° F. | | | | | | | | | | |
| Plastic Viscosity, cp | 18 | 25 | 21 | 110 | 19 | 24 | 19 | 21 | 20 | 27 |
| Yield Point, lb/100 ft² | 6 | 16 | 2 | −40 | 11 | 33 | 15 | 26 | 8 | 24 |
| 10 sec gel, lb/100 ft² | 5 | 9 | 2 | 3 | 6 | 12 | 7 | 10 | 6 | 13 |
| 10 min gel, lb/100 ft² | 8 | 13 | 3 | 5 | 11 | 18 | 14 | 20 | 11 | 24 |
| Properties After Static Aging 16 hr at 300° F., 500 psi, Tested at 120° F. | | | | | | | | | | |
| Plastic Viscosity, cp | 18 | 23 | 35 | too | 20 | 23 | 19 | 25 | 24 | 26 |
| Yield Point, lb/100 ft² | 4 | 12 | 2 | thick | 17 | 44 | 25 | 36 | 16 | 44 |
| 10 sec gel, lb/100 ft² | 4 | 8 | 3 | to | 10 | 29 | 13 | 24 | 15 | 38 |
| 10 min gel, lb/100 ft² | 6 | 11 | 4 | test | 18 | 40 | 25 | 39 | 21 | 57 |

Table II below shows a comparison between the separate addition of the clay and the terpolymer to the formulation and a gelling agent comprised of the terpolymer and the clay which has been blended and milled to produce a fine powder.

TABLE II

| Sample ID | I | II | III | IV |
|---|---|---|---|---|
| Viscosifying Agent | F | F | G | G |
| Amount, g | 6.0 | 7.5 | 6.0 | 7.5 |
| Blend Ratio, clay/polymer | 90/10 | 90/10 | 90/10 | 90/10 |
| Initial Properties at 120° F. | | | | |

TABLE II-continued

| Sample ID | I | II | III | IV |
|---|---|---|---|---|
| Plastic Viscosity, cp | 18 | 22 | 21 | 29 |
| Yield Point, lb/100 ft$^2$ | 12 | 20 | 14 | 20 |
| 10 sec gel, lb/100 ft$^2$ | 4 | 9 | 6 | 8 |
| 10 min gel, lb/100 ft$^2$ | 7 | 14 | 12 | 17 |
| Properties after Rolling 16 hr at 150° F., Tested at 120° F. | | | | |
| Plastic Viscosity, cp | 19 | 23 | 19 | 22 |
| Yield Point, lb/100 ft$^2$ | 8 | 20 | 9 | 35 |
| 10 sec gel, lb/100 ft$^2$ | 5 | 8 | 6 | 12 |
| 10 min gel, lb/100 ft$^2$ | 9 | 14 | 9 | 19 |
| Properties after Rolling 16 hr at 250° F., Tested at 120° F. | | | | |
| Plastic Viscosity, cp | 20 | 26 | 21 | 27 |
| Yield Point, lb/100 ft$^2$ | 14 | 36 | 13 | 40 |
| 10 sec gel, lb/100 ft$^2$ | 5 | 17 | 6 | 21 |
| 10 min gel, lb/100 ft$^2$ | 12 | 25 | 12 | 34 |
| Properties after Static Aging 16 hr at 300° F., 500 psi, Tested at 120° F. | | | | |
| Plastic Viscosity, cp | 21 | 34 | 17 | 24 |
| Yield Point, lb/100 ft$^2$ | 20 | 34 | 23 | 47 |
| 10 sec gel, lb/100 ft$^2$ | 12 | 32 | 12 | 44 |
| 10 min gel, lb/100 ft$^2$ | 21 | 40 | 22 | 45 |

Note:
"Fish Eyes" of Tek Mul #1949 polymer observed in samples I and II after initial mixing and after rolling 16 hr at 150° F.

As can be seen from Table I, the clay EPDM polymer blends produced the highest yield point and gel strength values. As can also be seen, the values increased with increased temperature exposure. It is apparent that the combination of the clay and the terpolymer provide a synergistic effect. Note from Table I that clay concentrations of almost twice those of clay/terpolymer blends are required to produce yield point and gel strengths equivalent to those of the blend. Yield point and gel strengths produced by the clay tend to decrease with increased temperature exposure. As can also be seen, in the formulations containing only the EPDM polymer, very low yield point and gel strengths are observed up to concentrations of 2 ppb of the polymer. At higher concentrations of the polymer, yield point and gel strength cannot be measured with standard equipment since it is believed that polymer entanglement becomes so severe at high concentrations that viscosity measurements are prevented. Note also that the blend containing 2 ppb of polymer also exhibits shear thickening or dilatant properties after rolling at 250° F. Also, very high plastic viscosity and negative yield point are observed. It should also be noted that for the organophilic clay/EPDM polymer blends, the amounts of the EPDM polymer present in the oil-mud formulations are less than 1.1 ppb. Accordingly, it is apparent that a synergistic effect exists between the clay and the EPDM polymer which results in maximum yield point and gel strength development in the oil-based drilling fluid formulation.

With respect to the data in Table II, it can be seen that if the gellant is prepared by forming the organophilic clay in the presence of the EPDM polymer, and while they are being admixed together, a vastly superior viscosifier is formed leading to a drilling mud formulation having excellent characteristics. In other words, addition of the gellant mixture in which the organophilic clay is formed in situ in the procedure in which the clay and polymer are mixed produces a vastly superior product over that obtained by adding the clay and polymer individually. Indeed, the thus formed gellant is superior to simply mixing an already formed organophilic clay and the EPDM polymer together. As can be seen, formulations which contain the gellant in which the organophilic clay is formed in situ in the mixing procedure, on the average, exhibit higher yield points and gel strengths throughout the test conditions as compared to formulations containing clay and the polymer added separately. Moreover, fish eyes, a result of poor dispersability of polymer, were observed in the formulations containing the separate addition of the clay and polymer, both after initial mixing and after rolling at 150° F. No fish eyes of polymers were observed in the formulations containing the plant blended product.

EXAMPLE 2

This example demonstrates how the gellant of the present invention comprised of a mixture of the organophilic clay and the EPDM polymer give unexpected results in oleaginous media comprised of hydrocarbon liquids having a low aromatic content. The procedure used in formulating the drilling fluids was essentially the same as that set out in Example 1. Two different hydrocarbons were used in forming the oleaginous phase -- diesel oil (samples 1A and 1B) and Escaid 110, a low aromatic content mineral oil containing 0.9 aromatics by weight and marketed by Exxon (samples 2A and 2B). The results are shown in Table 3 below.

TABLE 3

Comparison of Gellants in Diesel Oil and Escaid 110 Mineral Oil

| | IA | IB | IIA | IIB |
|---|---|---|---|---|
| Diesel Oil, ml | 237 | 237 | — | — |
| Escaid 110, ml | — | — | 237 | 237 |
| INVERMUL NT, g | 6 | 6 | 6 | 6 |
| EZ-MUL, NT, g | 3 | 3 | 3 | 3 |
| Lime, g | 5 | 5 | 5 | 5 |
| DURATONE HT, g | 5 | 5 | 5 | 5 |
| Water, ml | 78 | 78 | 78 | 78 |
| Gellant A, g | 6 | — | 6 | — |
| Gellant G, g | — | 6 | — | 6 |
| Barite, g | 146 | 146 | 146 | 146 |
| CaCl$_2$, g | 43 | 43 | 43 | 43 |
| Stirred, min | 20 | 20 | 20 | 20 |
| Rolled at 150° F., hr | 16 | 16 | 16 | 16 |
| Plastic Viscosity, cp | 36 | 55 | 16 | 40 |
| Yield Point, lb/100 ft$^2$ | 28 | 40 | 8 | 25 |
| 10 sec gel, lb/100 ft$^2$ | 14 | 20 | 2 | 7 |
| 10 min gel, lb/100 ft$^2$ | 18 | 38 | 4 | 12 |

It can be seen from the data in Table 3 that the gellant composition of the present invention provides vastly superior, indeed unexpected results when used in low aromatic content mineral oils. While the gellant composition of the present invention is more effective than a prior art organophilic clay in viscosifying a typical diesel fuel containing approximately 33% by weight aromatics, it is dramatically more effective, as compared with the prior art organophilic clay gellant, in viscosifying a low aromatic content mineral oil. Note that whereas the yield point in the formulation employing the diesel oil increases significantly using the gellant composition of the present invention, there is an unexpectedly sharp increase in yield point in the formulations which employ a low aromatic content mineral oil (Escaid 110). Thus, it is apparent that when used in low aromatic content mineral oil, the gellant composition of the present invention provides a synergistic and unexpected increase in yield point.

EXAMPLE 3

This example demonstrates how the gellant of the present invention is vastly superior than prior art organophilic clays in terms of fluid loss control. The procedure used in preparing the formulations was essentially the same as that described in Example 1. The results are shown in Table 4 below.

TABLE 4

Comparison of Gellants After Static Aging at 300° F.
(Rheological Properties and HPHT Filtrates)

| Sample Mark | A | B |
|---|---|---|
| Conoco LVT ®, ml | 237 | 237 |
| INVERMUL ® NT, g | 6 | 6 |
| EZ-MUL ® NT, g | 3 | 3 |
| Lime, g | 5 | 5 |
| Water, ml | 78 | 78 |
| Gellant A, g | 12 | — |
| Gellant G, g | — | 6 |
| $CaCl_2$ | 43 | 43 |
| Barite, g | 146 | 146 |
| Stirred, min | 25 | 25 |
| Rolled at 150° F., hr | 16 | 16 |
| Aged at 300° F., hr | 16 | 16 |
| Plastic Viscosity, cp | 25 | 34 |
| Yield Point, lb/100 ft$^2$ | 7 | 19 |
| 10 sec gel, lb/100 ft$^2$ | 2 | 5 |
| 10 min gel, lb/100 ft$^2$ | 4 | 9 |
| Filtrate, 300° F., 500 psi, ml | 16.0 | 2.2 |

Note that using prior art organophilic clay as a gellant, the filtrate is 16 ml (sample A), while when using the gellant of the present invention (sample B), the filtrate is 2.2 ml. Once again, the gellant provides an unexpectedly dramatic ability to decrease fluid loss over that achieved by prior art organophilic clays.

While the invention has been described with particular reference to a drilling fluid, the gellant composition of the present invention can also be used in other well bore fluids, such as completion fluids, workover fluids, packer fluids and the like.

The foregoing disclosure and description of the invention is illustrative and explanatory thereof, and various changes in the method steps may be made within the scope of the appended claims without departing from the spirit of the invention.

What is claimed is:

1. An oil-based drilling fluid comprising:
   a liquid oleaginous phase;
   a polar liquid phase, said oleaginous phase being present in an amount of from about 30 to about 98% by volume of the liquid phase, said polar liquid phase being present in an amount of from about 2 to about 70% by volume of the liquid phase;
   an emulsifier; and
   a gellant comprising
      a sulfonated ethylene/propylene/5-phenyl-2-norbornene terpolymer having a number average molecular weight of about 5,000 to about 300,000; and
      an organophilic clay comprising the reaction product of an organic onium compound and a smectite clay, the weight ratio of said organophilic clay to said terpolymer being from about 6:1 to about 20:1, said gellant being present in an amount sufficient to viscosify said oleaginous medium to the desired degree.

2. The drilling fluid of claim 1 wherein said gellant comprises a mixture of an organophilic clay and said terpolymer in which said organophilic clay has been formed in situ while said clay and said terpolymer are being admixed to form said mixture.

3. The drilling fluid of claim 1 wherein said liquid oleaginous phase comprises a liquid selected from the group consisting of light lubricating oil fractions, heavy naptha having a boiling range between about 300° to about 600° F., crude petroleum oil from which the light ends have been removed, still bottoms and diesel oil obtained from the crude distillation of crude petroleum oil, low aromatic content mineral oil and mixtures thereof.

4. The drilling fluid of claim 3 wherein said liquid oleaginous phase comprises a low aromatic content hydrocarbon liquid.

5. The drilling fluid of claim 1 wherein said smectite clay is selected from the group consisting of montmorillonite, hectorite and saponite.

6. The drilling fluid of claim 5 wherein said montmorillonite clay is Wyoming bentonite.

7. The drilling fluid of claim 1 wherein said organic onium compound is selected from the group consisting of acidic salts of primary, secondary and tertiary organic amines and organic quaternary ammonium compounds, said organic onium compound containing at least one organic radical having at least 10 carbon atoms selected from the group consisting of alkyl, alkylene and alkylidiene.

8. The drilling fluid of claim 1 further comprising a weighting agent.

9. The drilling fluid of claim 1 wherein the weight ratio of said organophilic clay to said terpolymer is from about 85:15 to about 95:5.

10. The drilling fluid of claim 1 wherein the polar liquid phase comprises an aqueous medium.

11. A composition for gelling liquid hydrocarbon-based well bore fluids comprising:
   an intimate mixture of
      an organophilic clay comprising the reaction product of an organic onium compound and a smectite clay, and
      a sulfonated, ethylene/propylene-5-phenyl-2-norbornene terpolymer having a number average molecular weight of about 5,000 to about 300,000, the weight ratio of said organophilic clay to said terpolymer being from about 6:1 to about 20:1.

12. The composition of claim 11 wherein said smectite clay is selected from the group consisting of montmorillonite, hectorite and saponite.

13. The composition of claim 11 wherein said organic onium compound is selected from the group consisting of acidic salts of primary, secondary and tertiary organic amines and organic quaternary ammonium compounds, said organic onium compound containing at least one organic radical having at least 10 carbon atoms selected from the group consisting of alkyl, alkylene and alkylidiene.

14. The composition of claim 10 wherein said mixture of said clay and said terpolymer comprises a mixture of an organophilic clay and said terpolymer in which said organophilic clay has been formed in situ while said clay and said terpolymer are being admixed to form said mixture.

15. The composition of claim 11 wherein said organophilic clay and said terpolymer comprise an intimate mixture formed by milling.

16. A method of preparing a composition for gelling liquid hydrocarbon based well bore fluids comprising:
   introducing into a mixer a smectite clay, an organic onium compound and a sulfonated ethylene/propylene/5-phenyl-2-norbornene terpolymer having a number average molecular weight of about 5,000 to about 300,000, the weight ratio of said organophilic clay to said terpolymer being from about 6:1 to about 20:1; and forming an organophilic clay by the reaction of said organic onium compound and said smectite clay while said clay and said terpolymer are being mixed.

17. The method of claim 16 wherein said smectite clay is selected from the group consisting of montmorillonite, hectorite and saponite.

18. The method of claim 16 wherein said smectite clay is Wyoming bentonite.

19. The method of claim 16 wherein said organic onium compound is selected from the group consisting of acidic salts of primary, secondary and tertiary organic amines and organic quaternary ammonium compounds, said organic onium compound containing at least one radical having at least ten carbon atoms selected from the group consisting of alkyl, alkylene and alkylidiene.

20. The method of claim 16 wherein the weight ratio of said clay to said terpolymer is from about 6:1 to about 20:1.

21. The method of claim 16 wherein the weight ratio of said clay to said terpolymer is from about 85:15 to about 95:5.

* * * * *